US011969996B2

(12) United States Patent
Hirobe et al.

(10) Patent No.: US 11,969,996 B2
(45) Date of Patent: Apr. 30, 2024

(54) PRINTING APPARATUS

(71) Applicant: CANON KABUSHIKI KAISHA, Tokyo (JP)

(72) Inventors: Kazuki Hirobe, Tokyo (JP); Hironori Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 17/690,025

(22) Filed: Mar. 9, 2022

(65) Prior Publication Data

US 2022/0288923 A1 Sep. 15, 2022

(30) Foreign Application Priority Data

Mar. 15, 2021 (JP) ................................ 2021-041251

(51) Int. Cl.
*B41J 2/045* (2006.01)
*B41J 2/175* (2006.01)

(52) U.S. Cl.
CPC ....... *B41J 2/04541* (2013.01); *B41J 2/04563* (2013.01); *B41J 2/175* (2013.01)

(58) Field of Classification Search
CPC .. B41J 2/04563; B41J 2/04551; B41J 2/0458; B41J 2/04521; B41J 2/175; B41J 29/02; B41J 2/04541
See application file for complete search history.

(56) References Cited

U.S. PATENT DOCUMENTS 7,309,120 B2 12/2007 Hatsui et al.
7,896,469 B2 * 3/2011 Furukawa ............ B41J 2/04543 347/50
8,070,262 B2 * 12/2011 Yamaguchi ............ B41J 2/0455 347/62
2007/0091131 A1 4/2007 Hatsui et al.
2022/0111635 A1 4/2022 Naka et al.

FOREIGN PATENT DOCUMENTS

JP 2006-015736 A 1/2006

* cited by examiner

*Primary Examiner* — An H Do
(74) *Attorney, Agent, or Firm* — Venable LLP

(57) ABSTRACT

An object of the present disclosure is to perform both heater drive control and fuse drive control without increasing the number of signal lines. One embodiment of the present invention is a printing apparatus including: a print head having a plurality of heaters for heating and ejecting ink and a fuse for retaining information; and a print head control unit configured to control the print head, and the print head control unit has a heater drive control unit configured to control drive of the plurality of heaters and a write pulse generation unit configured to generate a write pulse for performing write for the fuse and data that is generated by the heater drive control unit and the write pulse are transmitted from the print head control unit to the print head via an identical terminal and an identical signal line.

6 Claims, 8 Drawing Sheets

| Mode Data | Print Head Drive |
|---|---|
| 0000 | Heater drive |
| 1010 | Fuse read |
| 0101 | Fuse write |
| **** | **** |

FIG.6

PRINTING APPARATUS

BACKGROUND

Field

The present disclosure relates to a control circuit of a print head of a printing apparatus.

Description of the Related Art

Japanese Patent Laid-Open No. 2006-15736 has disclosed, as a print head of an ink jet printing apparatus, a print head having a heater for ejecting ink and a fuse for retaining information on the print head.

SUMMARY

However, according to Japanese Patent Laid-Open No. 2006-15736, it is necessary to provide a signal line for sending a signal to control the fuse, in addition to a signal line for sending a signal to drive the heater, and therefore, the number of signal lines increases. An increase in the number of signal lines results in an increase in the number of terminals of the print head and an increase in the contact area in the print head, and therefore, the cost is raised.

Consequently, in view of the above-described problem, an object of one embodiment of the present invention is to perform both heater drive control and fuse drive control without increasing the number of signal lines.

One embodiment of the present invention is a printing apparatus including: a print head having a plurality of heaters for heating and ejecting ink and a fuse for retaining information; and a print head control unit configured to control the print head, wherein the print head control unit has a heater drive control unit configured to control drive of the plurality of heaters and a write pulse generation unit configured to generate a write pulse for performing write for the fuse and data that is generated by the heater drive control unit and the write pulse are transmitted from the print head control unit to the print head via an identical terminal and an identical signal line.

Further features of the present disclosure will become apparent from the following description of exemplary embodiments with reference to the attached drawings.

BRIEF DESCRIPTION OF THE DRAWINGS

FIG. 6 is a diagram showing an example of a table retaining mode data;

DESCRIPTION OF THE EMBODIMENTS

In the following, with reference to the attached drawings, preferred embodiments of the present invention are explained. However, the configurations disclosed in the following are merely exemplary and the present disclosure is not limited to the configurations shown schematically.

In the present specification, “printing” (there is also a case where printing is referred to as “print”) represents not only a case where significant information, such as a character and a figure, is formed but also a case where information whether or not it is significant is formed. Further, it is assumed that printing represents, in a broad sense, a case where an image, a pattern or the like is formed on a printing medium, and a case where a medium is modified, irrespective of whether or not printing creates something so that it can be perceived by the human sense of sight.

Further, “printing medium” represents not only paper that is used in a general printing apparatus but also widely represents any material capable of receiving ink, such as cloth, plastic, film, metal plate, glass, ceramics, wood, and leather.

Furthermore, “ink” (there is also a case where ink is referred to as “liquid”) should be interpreted in a broad sense like the definition of the above-described “printing (print)”. Consequently, it is assumed that ink represents a liquid that can be provided for the formation of an image, a pattern or the like by being attached onto a printing medium, the modification of a printing medium, or the processing of ink (for example, solidification or insolubilization of the color material in the ink that is attached to a printing medium).

Still furthermore, it is assumed that “printing element” comprehensively refers to an element that generates energy, such as a heater for heating ink and a piezoelectric element.

First Embodiment

<Configuration of Ink Jet Printing Apparatus>

Figure 1:
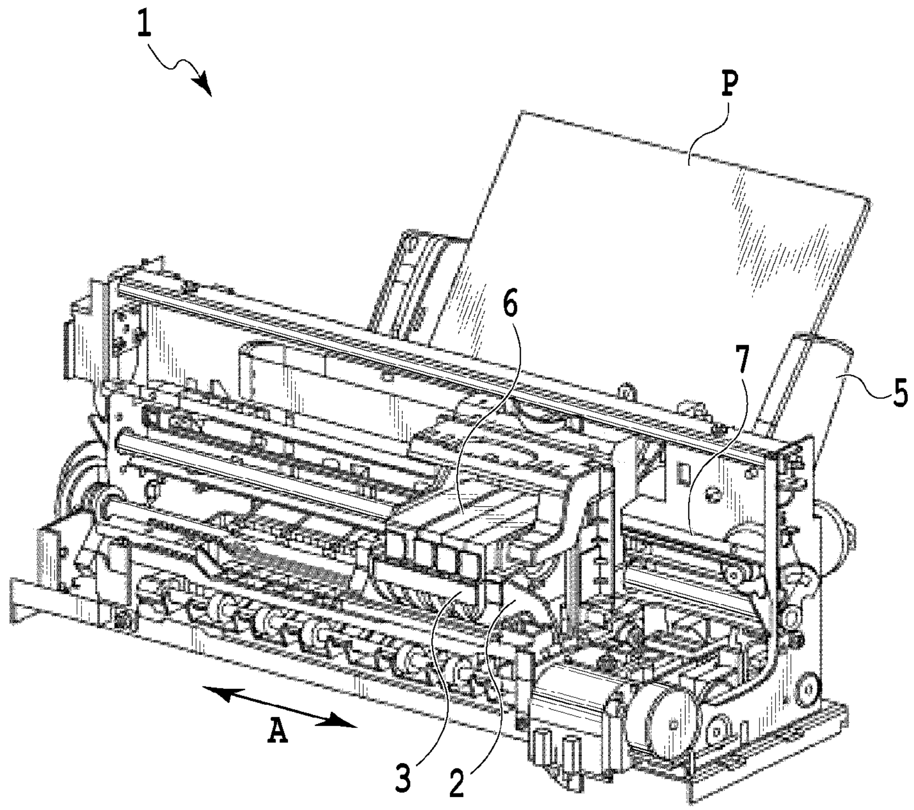
FIG. 1 is a perspective diagram showing an outer appearance of a printing apparatus.

FIG. 1 is a perspective diagram showing an outer appearance of an ink jet printing apparatus (in the following, referred to as printing apparatus) in the present embodiment.

As shown in FIG. 1, a printing apparatus 1 has a carriage 2 on which an ink jet print head (in the following, print head) 3 that performs printing by ejecting ink in accordance with the ink jet method, and the printing apparatus 1 performs printing by reciprocating the carriage 2 in an arrow A direction. In the printing apparatus 1, printing is performed by a printing medium P, such as printing paper, being fed via a sheet feeding mechanism 5, the fed printing medium P being conveyed up to a printing position, and the print head 3 ejecting ink onto the printing medium P at the printing position.

On the carriage 2, not only the print head 3 is mounted, but also an ink cartridge 6 for storing ink to be supplied to the print head 3 is also attached thereto. The ink cartridge 6 is configured to be attached to the carriage 2 detachably.

The printing apparatus 1 is capable of color printing and on the carriage 2, four ink cartridges in which ink of magenta (M), cyan (C), yellow (Y), and black (K) is stored, respectively, as ink used for color printing, are mounted. It is possible to independently attach each of these four ink cartridges detachably.

As the print head 3 of the present embodiment, an ink jet print head that ejects ink by utilizing thermal energy is adopted. Because of this, the print head 3 has an electrothermal converter. This electrothermal converter is provided for each of a plurality of ejection ports in a correspondence manner and by applying a pulse voltage to the corresponding electrothermal converter in accordance with a printing signal, ink is ejected from the ejection port corresponding to the electrothermal converter.

Further, along the movement direction of the carriage 2, a scale 7 is provided. On the scale 7, slits are provided at predetermined intervals and by an encoder (not shown schematically) mounted on the carriage 2 reading the slit in accordance with the movement of the carriage 2, an encoder signal is generated. This encoder signal is a signal indicating the carriage position (that is, the position of the print head) in the movement direction of the carriage 2. Based on the period of this encoder signal (encoder signal interval), the moving speed of the carriage is calculated and used as a signal for timing control at the time of the encoder signal ejecting ink.

<Control Configuration>

Figure 2:
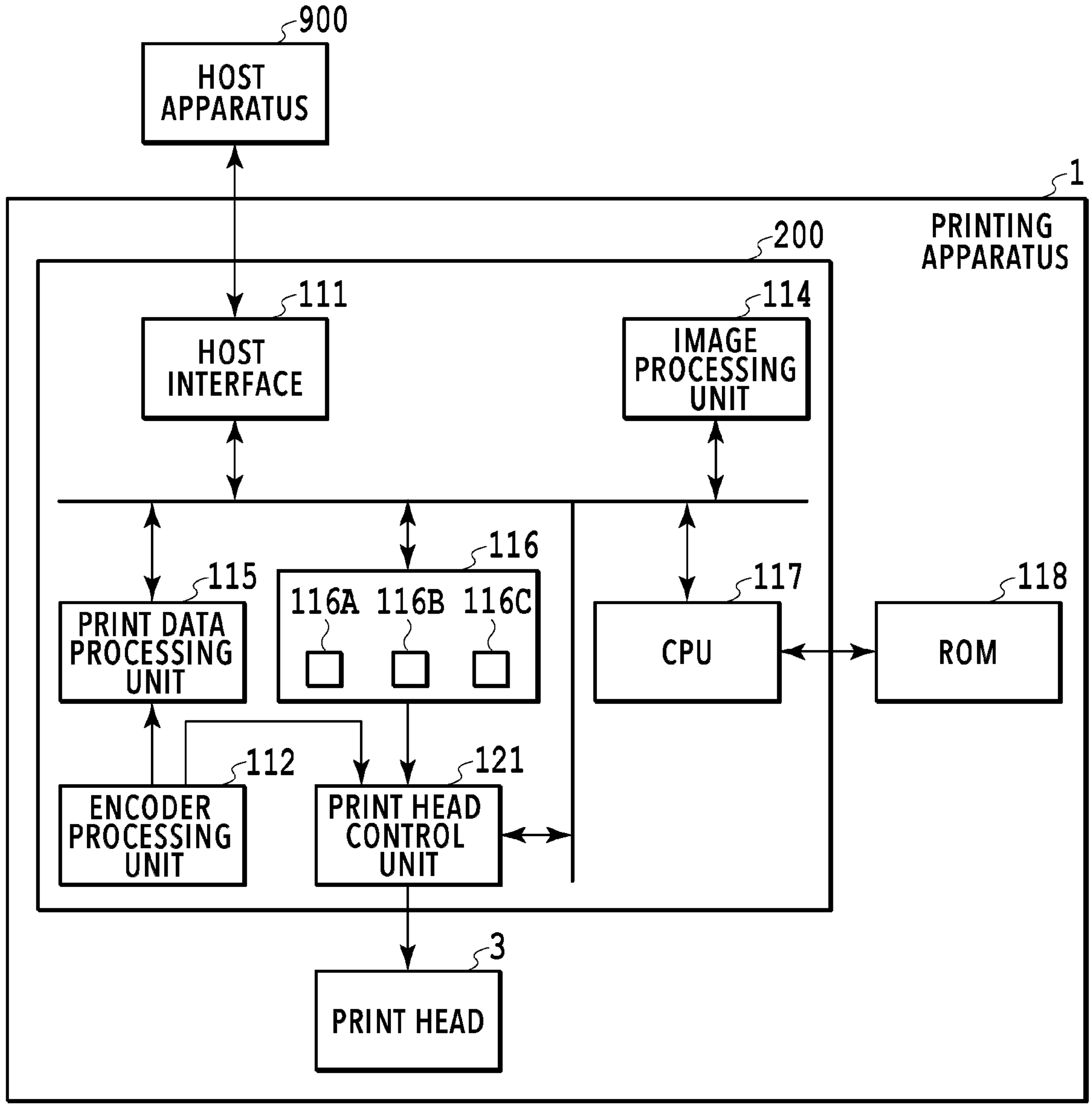
FIG. 2 is a block diagram showing a control configuration of the printing apparatus.

FIG. 2 is a block diagram showing the configuration of a control IC 200 that governs control of the printing apparatus 1 shown in FIG. 1.

To a host interface 111 mounted in the control IC 200, image data transmitted from a host apparatus 900 is input. This image data is bitmap format image data in which each pixel has pixel values of three channels of red (R), green (G), and blue (B) and is stored in a reception buffer 116A provided in a RAM 116. An image processing unit 114 converts this image data into multivalued data of color components of CMYK and stores the multivalued data in a multivalued data buffer 116B provided in the RAM 116. A print data processing unit 115 converts multivalued data into dot data (binary data) and stores the dot data in a dot data buffer 116C.

A print head control unit 121 transfers the binary data stored in the dot data buffer 116C to the print head 3. The print head control unit 121 comprises a function to thin binary data, in addition to the function to perform data transfer. The processing in the print data processing unit 115 is processing in accordance with conveyance timing by synchronizing with a heat trigger signal that is output by an encoder processing unit 112 and by the print head control unit 121 synchronizing with a block trigger signal that is output by the encoder processing unit 112.

A CPU 117 performs drive control of a printing element, relative conveyance control between the printing element and a printing medium (for example, sheet) and the like in accordance with control programs stored in a ROM 118.

Further, the print head control unit 121 performs read (operation) and write (operation) for the fuse mounted in the print head 3.

In the following, explanation is given by taking a serial-type print head as an example, which performs repetition movement in the width direction of a printing medium, but the print head is not limited to this and it is possible to apply the present embodiment to any type of print head. For example, it may also be possible to apply the present embodiment to a full-line type print head having a width greater than the paper width.

Further, in the following, explanation is given by focusing attention on one print head, but it is possible to apply the present embodiment to a printing apparatus having a plurality of print heads.

<Configuration of Print Head>

Figure 3:
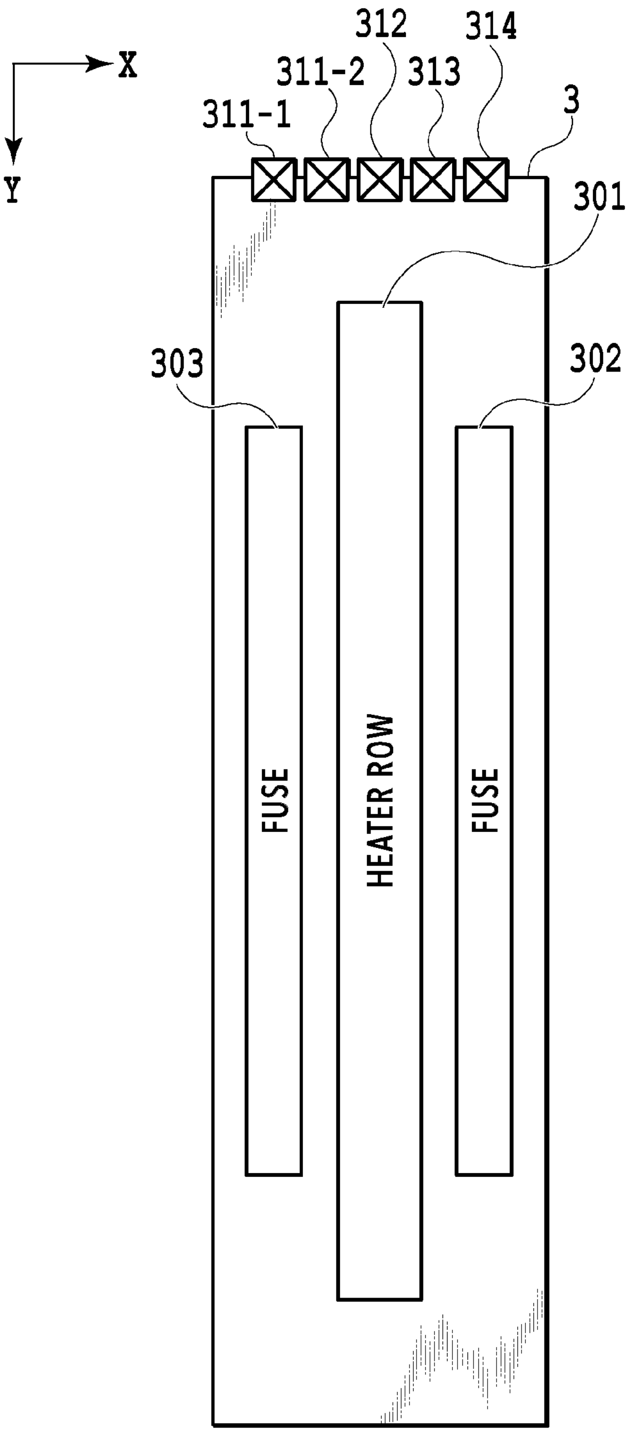
FIG. 3 is a diagram showing an outline configuration of a print head.

FIG. 3 is a diagram showing an outline configuration of the print head 3 shown in FIG. 1 and FIG. 2. The print head 3 has, as terminals to receive signals from the control IC 200, a DATA_1 terminal 311-1, a DATA_2 terminal 311-2, a heat enable (in the following, HENB) terminal 312, a CLK terminal 313, and an LT terminal 314.

In the present embodiment, two signal lines of DATA signals are connected to the print head 3, and therefore, the print head 3 has the two DATA terminals (DATA_1 terminal 311-1, DATA_2 terminal 311-2). However, the number of signal lines of the DATA signal and the number of DATA terminals are not limited to two and may be an arbitrary value larger than or equal to two.

The print head 3 has a heater row 301 in which a plurality of heaters for ejecting ink is arrayed and a fuse 302 for retaining information on the print head. The heater row 301 has a first heater row including 768 heaters arrayed along the Y-direction and a second heater row including 768 heaters arrayed in the Y-direction and the position in the X-direction of the first heater row and the position in the X-direction of the second heater row are different.

Further, in the print head 3, although not shown schematically, a logic circuit for driving and selecting the heater row 301 and the fuse 302 is mounted. The control IC 200 controls the print head 3 by using the DATA signal, a CLK signal, an LT signal, an HENB signal, and other signals.

<Configuration of Heater Control Unit and Fuse Control Unit>

Figure 4:
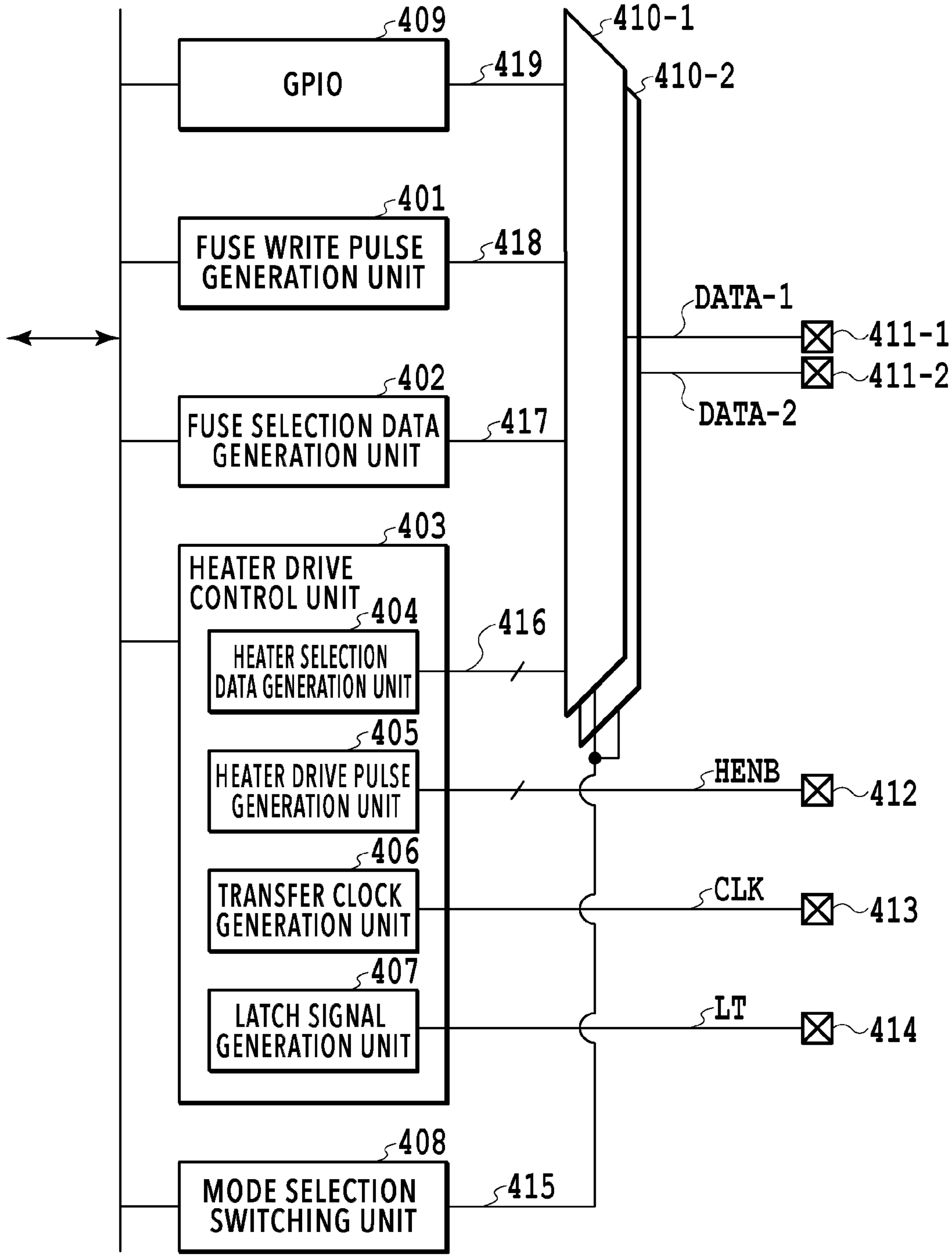
FIG. 4 is a block diagram showing a configuration of a heater control unit and a fuse control unit included in a print head control unit.

FIG. 4 is a diagram showing the configuration of a heater control unit and a fuse control unit in the print head control unit 121 of the control IC 200. A heater selection data generation unit 404 within a heater drive control unit 403 generates heater selection data 416 for specifying a heater that is driven to eject ink and selecting the specified heater. A heater drive pulse generation unit 405 determines a time length during which the heater is driven for the heater specified by the heater selection data generation unit 404 and generates the HENB signal corresponding to the time length. A transfer clock generation unit 406 generates the CLK signal used for transferring the DATA signal to the print head. The frequency of the CLK signal that is transferred and the number of transferred CLK signals can be changed by a user setting. A latch signal generation unit 407 generates the LT signal for latching the DATA signal transferred to the print head. A fuse selection data generation unit 402 selects a fuse for which read or write is performed (that is, control-target fuse) from among a plurality of fuses comprised in the print head and generates fuse selection data 417. A fuse write pulse generation unit 401 generates a fuse write pulse 418 at the time of performing write for the fuse selected by the fuse selection data generation unit 402. In the generation of the fuse write pulse 418, a pulse whose High period and Low period are identical is generated. The period of the pulse, which is the sum of the High period and the Low period, and the number of pulses to be generated can be changed by a user setting. A GPIO 409 generates a signal at a constant level of High or Low as a port signal 419.

A mode selection switching unit 408 determines either the heater drive mode or the fuse drive mode. After that, the mode selection switching unit 408 determines which of the heater selection data 416, the fuse selection data 417, the fuse write pulse 418, and the port signal 419 to transfer as the DATA signal and generates a mode selection signal 415 in accordance with the determination.

Selector circuits 410-1 and 410-2 each select a signal from the port signal 419, which is output as the DATA signal, in accordance with the value of the mode selection signal 415 generated by the mode selection switching unit 408. Specifically, the selector circuits 410-1 and 410-2 each select the signal that is output as the DATA signal from among the heater selection data 416, the fuse selection data 417, the fuse write pulse 418, and the port signal 419.

The print head control unit 121 has, as terminals to transmit a signal to the print head 3, a DATA_1 terminal 411-1, a DATA_2 terminal 411-2, an HENB terminal 412, a CLK terminal 413, and an LT terminal 414.

The DATA_1 terminal 411-1 is connected with the DATA_1 terminal 311-1. The DATA_2 terminal 411-2 is connected with the DATA_2 terminal 311-2. The HENB terminal 412 is connected with the HENB terminal 312. The CLK terminal 413 is connected with the CLK terminal 313. The LT terminal 414 is connected with the LT terminal 314.

<Timing Chart of Signal that is Input to Print Head>

Figure 5A:
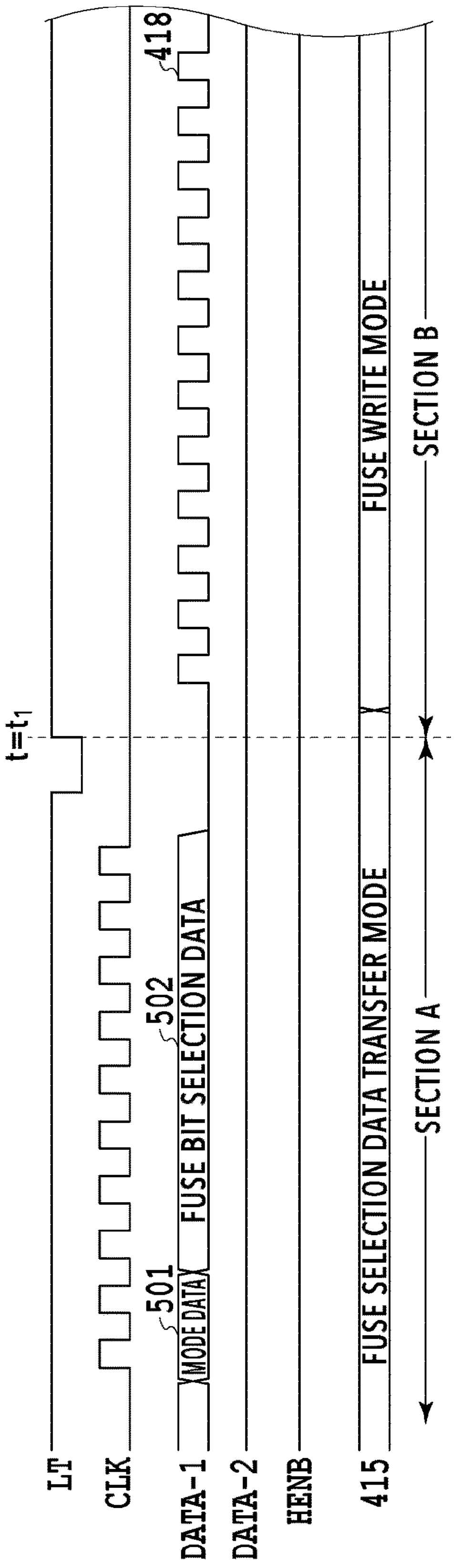
FIG. 5A and FIG. 5B are each a diagram showing a waveform of each signal that is transmitted from the print head control unit to the print head.
Figure 5B:
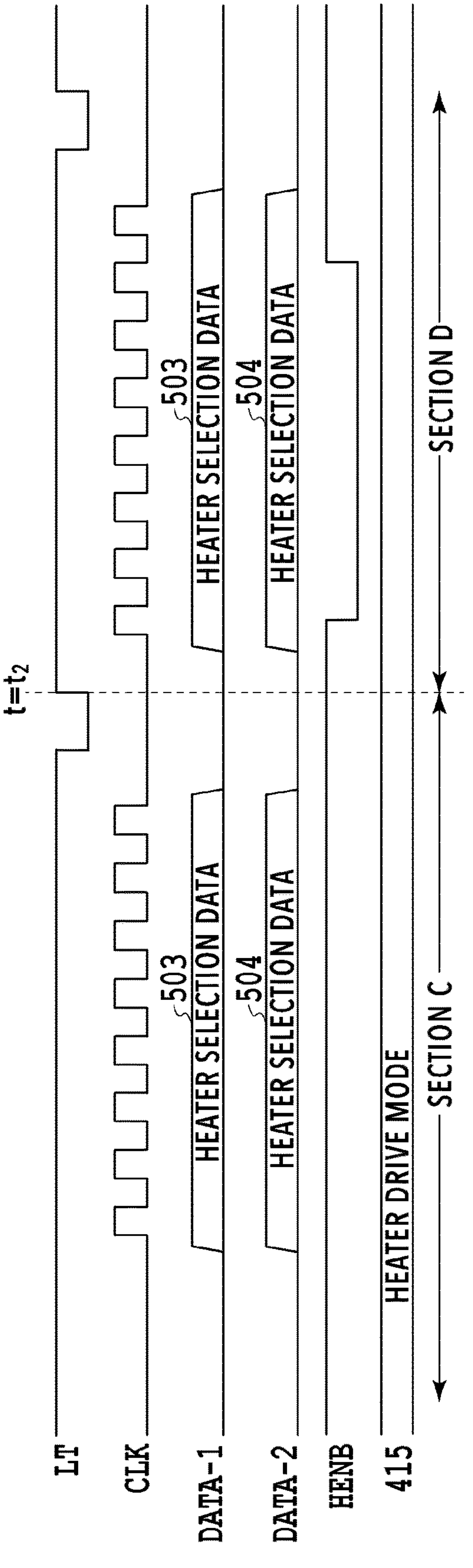

FIG. 5A and FIG. 5B are each a diagram showing waveforms of the LT signal, the CLK signal, a DATA-1 signal, a DATA-2 signal, the HENB signal, and the mode selection signal 415.

FIG. 5A shows the waveform of each signal at the time of fuse write to write data to the fuse. The DATA-1 signal and the DATA-2 signal are each transferred in synchronization with the CLK signal and the print head 3 latches data at both edges of the rise edge and the fall edges of the CLK signal. In a section A in FIG. 5A, fuse selection is performed. In the section A, the mode selection signal 415 is a signal for selecting a mode to output the fuse selection data 417 (fuse selection data transfer mode). Further, as DATA-1 in the section A, mode data 501 is transferred and following this, fuse bit selection data 502 is transferred.

As the mode data 501 at the time of fuse write, mode data having a value of 0101 indicating fuse write (see FIG. 6) is transferred and as the fuse bit selection data 502, data for selection based on the fuse bit that is selected is transferred. As the DATA-2 signal, the signal at a constant level generated in the GPIO 409, that is, the High signal is output. After the DATA-1 signal and the DATA-2 signal are transferred, the LT signal is changed from Low to High. In a case where the DATA-2 signal is at High at this timing of Low→High (in FIG. 5A, timing of $t=t_1$), in a section B next to the section A, fuse drive is performed.

In detail, in the section B, write for the fuse selected in the section A is performed. In the section B, the mode selection signal 415 is a signal for selecting a mode to output the fuse write pulse 418 as the DATA-1 signal (fuse write mode). As the DATA-1 signal, the fuse write pulse 418 is output and write is performed for the fuse selected in the section A. The number of pulses of the fuse write pulse 418 that is output in the section B is as large as about 100,000. Consequently, it is necessary to set the section B long compared to the predetermined period of the section A.

FIG. 5B shows the waveform of each signal at the time of heater drive. The DATA-1 signal and the DATA-2 signal are each transferred in synchronization with the CLK signal and the print head 3 latches data at both edges of the rise edge and the fall edge of the CLK signal. In a section C in FIG. 5B, a heater that is driven in a section D is selected. In the section C, the mode selection signal 415 is a signal for selecting a mode to output the heater selection data 416 (heater drive mode).

The mode data value at the time of heater drive is 0000 as shown in FIG. 6, and therefore, normally, at the time of heater drive, it is necessary to transfer mode data having this mode data value. However, in the present embodiment, the configuration of the circuit that latches mode data within the print head 3 is such that in a case where the DATA-2 signal is at Low at the time of rise of the LT signal, the mode data value is cleared to 0000, and therefore, it is not necessary to transfer mode data at the time of heater drive. That is, the number of CLKs that are transferred at the time of heater drive may be smaller than the number of CLKs that are transferred at the time of fuse drive. Consequently, as shown in FIG. 5B, it is sufficient to transfer only heater selection data 503 as the DATA-1 signal and transfer only heater selection data 504 as the DATA-2 signal. After transferring the DATA-1 signal and the DATA-2 signal, the LT signal is changed from Low to High. In a case where the DATA-2 signal value is at Low at this timing of Low→High (in FIG. 5B, timing of $t=t_2$), in the section D next to the section C, heater drive is performed.

In detail, in the section D, the drive for the heater selected in the section C and the selection of a heater that is driven in a section (not shown schematically) next to the section D is performed. Specifically, by the HENB signal, the heater selected in the section C is driven and by the DATA-1 signal and the DATA-2 signal, the selection of a heater that is driven in the section next to the section D is performed.

The mode data table in FIG. 6 is merely an example and the value of each mode is not limited to that shown in FIG. 6.

<Control Flow>

Figure 7:
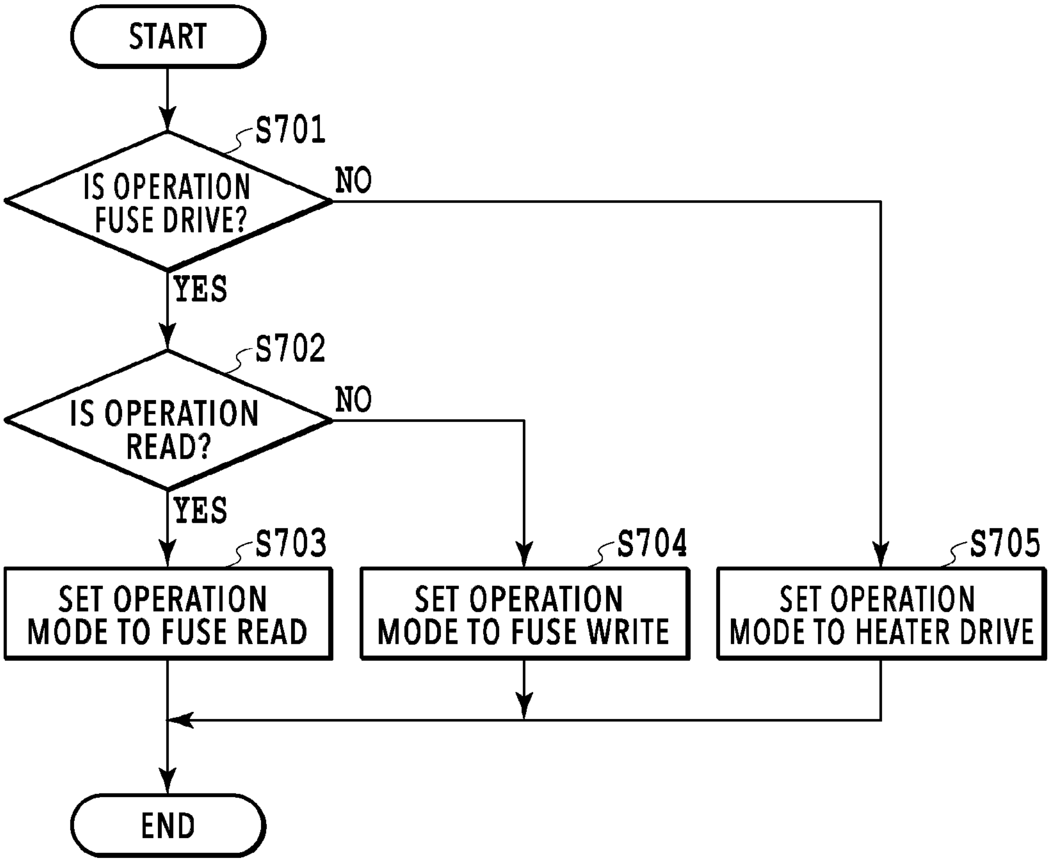
FIG. 7 is a diagram showing a control flow of a control IC.

FIG. 7 is a flowchart of a series of processing that is performed to determine in which mode the print head 3 is caused to operate, that is, in which of the heater drive mode and a fuse drive mode the print head 3 is caused to operate. As the trigger to start this flow, mention is made of the turning ON of the power source of the printing apparatus 1, the reception of a print job and the like.

At step S701, the CPU 117 determines whether the operation scheduled for the print head 3 is the fuse drive in accordance with control programs. In a case where determination results at this step are affirmative, the processing advances to step S702 and on the other hand, in a case where the determination results are negative, the processing advances to step S705. In the following, for simplification, "step S-" is abbreviated to "S-".

At S702, the CPU 117 determines whether the operation scheduled for the fuse is read. In a case where determination results at this step are affirmative, the processing advances to S703 and on the other hand, in a case where the determination results are negative, the processing advances to S704.

At S703, the CPU 117 sets the operation mode of the print head 3 to a fuse read mode.

At S704, the CPU 117 sets the operation mode of the print head 3 to the fuse write mode. The print head 3 in the fuse write mode performs the operation shown in FIG. 5A.

At S705, the CPU 117 sets the operation mode of the print head 3 to the heater drive mode. The print head 3 in the heater drive mode performs the operation shown in FIG. 5B.

<Circuit Configuration within Print Head>

Figure 8:
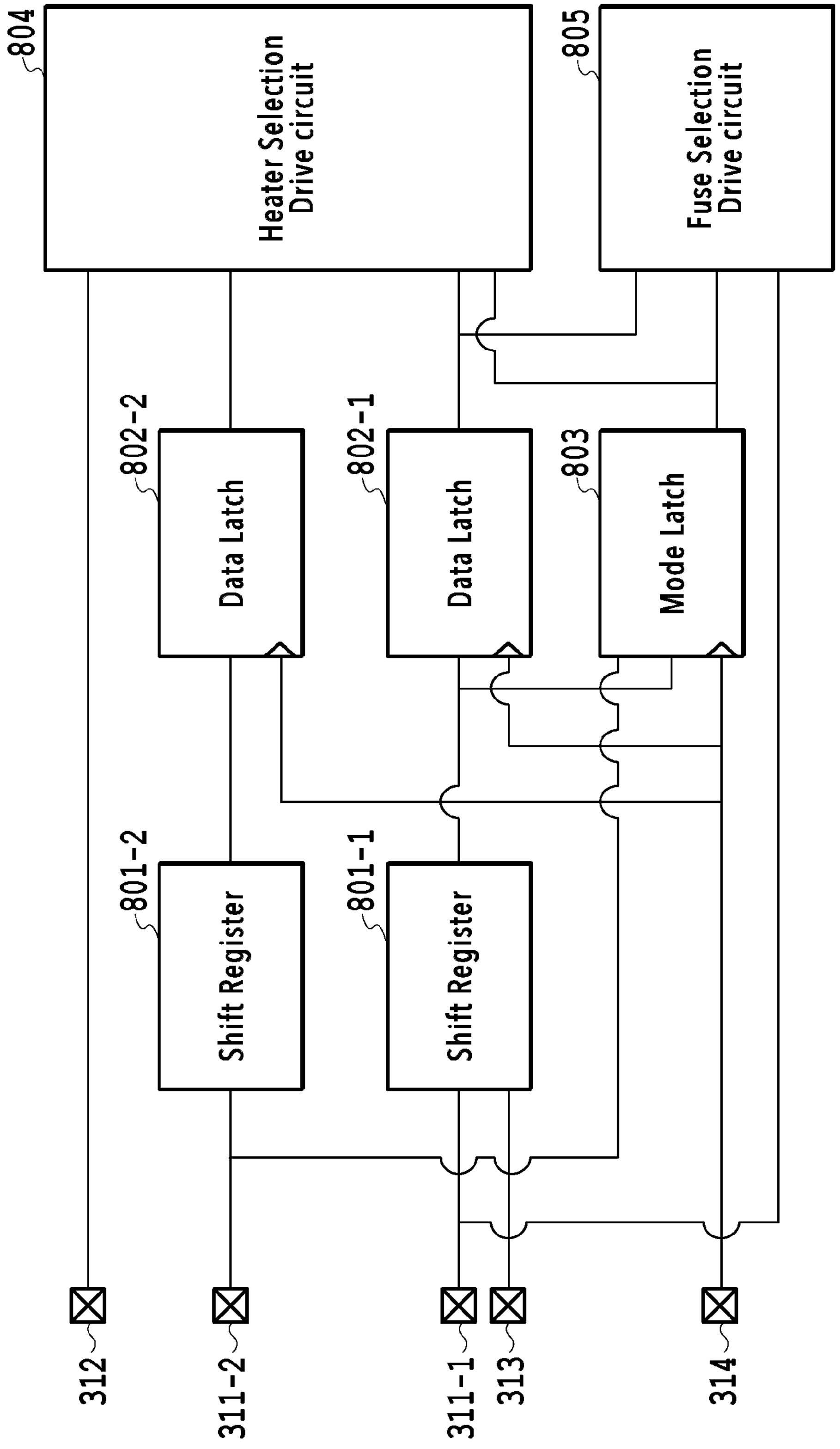
FIG. 8 is a diagram showing a circuit configuration within the print head.

FIG. 8 is a schematic diagram of the circuit configuration within the print head 3, specifically, the circuit configuration relating to heater selection and fuse selection. A Shift Register circuit 801-1 is a shift register circuit that latches the DATA-1 at both edges of CLK and a Shift Register 801-2 is a shift register circuit that latches DATA-2 at both edges of CLK. A Mode Latch circuit 803 is a circuit that latches a mode data portion (501 in FIG. 5A) of the DATA-1 latched by the Shift Register circuit 801-1 and latches the mode data portion at the rise of the LT signal. However, at the time of latching the mode data portion at the rise of the LT signal, in a case where the signal level of the DATA-2 is Low, the Mode Latch circuit 803 clears the value of the mode data to 0000.

A Data Latch circuit 802-1 is a circuit that latches the portion other than the mode data portion of the DATA-1 latched by the Shift Register circuit 801-1 and latches the portion at the rise of the LT signal. A Data Latch circuit 802-2 is a circuit that latches the DATA-2 latched by the Shift Register 801-2 and latches the DATA-2 at the rise of the LT signal.

A Heater Selection Drive circuit 804 selects, in a case where the value of the mode data latched by the Mode Latch circuit 803 indicates 0000, that is, heater drive (FIG. 6), a heater that is driven is selected based on the data latched by the Data Latch circuits 802-1 and 802-2. After that, the Heater Selection Drive circuit 804 drives the heater based on the HENB signal.

A Fuse Selection Drive circuit 805 selects, in a case where the value of the mode data latched by the Mode Latch circuit 803 indicates 1010, that is, fuse read (see FIG. 6), the relevant fuse based on the data latched by the Data Latch circuit 802-1. Then, the Fuse Selection Drive circuit 805 performs read for the selected fuse.

The Fuse Selection Drive circuit 805 selects, in a case where the value of the mode data latched by the Mode Latch circuit 803 indicates 0101, that is, fuse write (see FIG. 6), the relevant fuse based on the data latched by the Data Latch circuit 802-1. Then, the Fuse Selection Drive circuit 805 performs write for the selected fuse.

Effects of the Present Embodiment

By the above configuration, it is made possible to perform both heater drive control and fuse drive control without increasing the number of signal lines.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present invention, it is possible to perform both heater drive control and fuse drive control without increasing the number of signal lines.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-041251, filed Mar. 15, 2021, which is hereby incorporated by reference herein in its entirety.

What is claimed is:

1. A printing apparatus comprising:

a print head comprising (1) a plurality of heaters for heating and ejecting ink and (2) a fuse for retaining information; and a print head control unit configured to control the print head, wherein the print head control unit comprises (1) a heater drive control unit configured to control drive of the plurality of heaters and (2) a write pulse generation unit configured to generate a write pulse for performing write for the fuse, wherein data that is generated by the heater drive control unit and the write pulse are transmitted from the print head control unit to the print head via an identical terminal and an identical signal line, and wherein the print head control unit further comprises (1) a GPIO that generates a signal at a constant level of High or Low and (2) a mode selection switching unit configured to switch between heater control and fuse control.

2. The printing apparatus according to claim 1, wherein the print head comprises a plurality of fuses, and wherein the print head control unit further comprises a fuse selection data generation unit configured to generate fuse selection data for selecting a fuse for which read or write is performed from among the plurality of fuses.

3. The printing apparatus according to claim 2, wherein the heater drive control unit comprises (1) a first generation unit configured to generate heater selection data for selecting a heater that is driven from among the plurality of heaters, (2) a second generation unit configured to generate a pulse for driving a heater specified by the first generation unit, (3) a third generation unit configured to generate a CLK signal, and (4) a fourth generation unit configured to generate an LT signal.

4. The printing apparatus according to claim 1, wherein the print head control unit:

transmits, in a case of performing heater control, data that is generated by the heater drive control unit to the print head via the identical terminal and the identical signal line; and transmits, in a case of performing fuse control, one of the fuse selection data, the write pulse, and a signal that is generated by the GPIO to the print head via the identical terminal and the identical signal line.

5. The printing apparatus according to claim 1, wherein in data that is transmitted from the print head control unit to the print head, data of an operation mode indicating which of heater control and fuse control is performed is included.

6. The printing apparatus according to claim 1, wherein the write pulse that is generated by the write pulse generation unit is a pulse whose High period and Low period are identical and the number of pulses and the period are variable.

* * * * *